H. M. WYETH.
Corn Planter.
No. 39,982.
Patented Sept. 15, 1863.
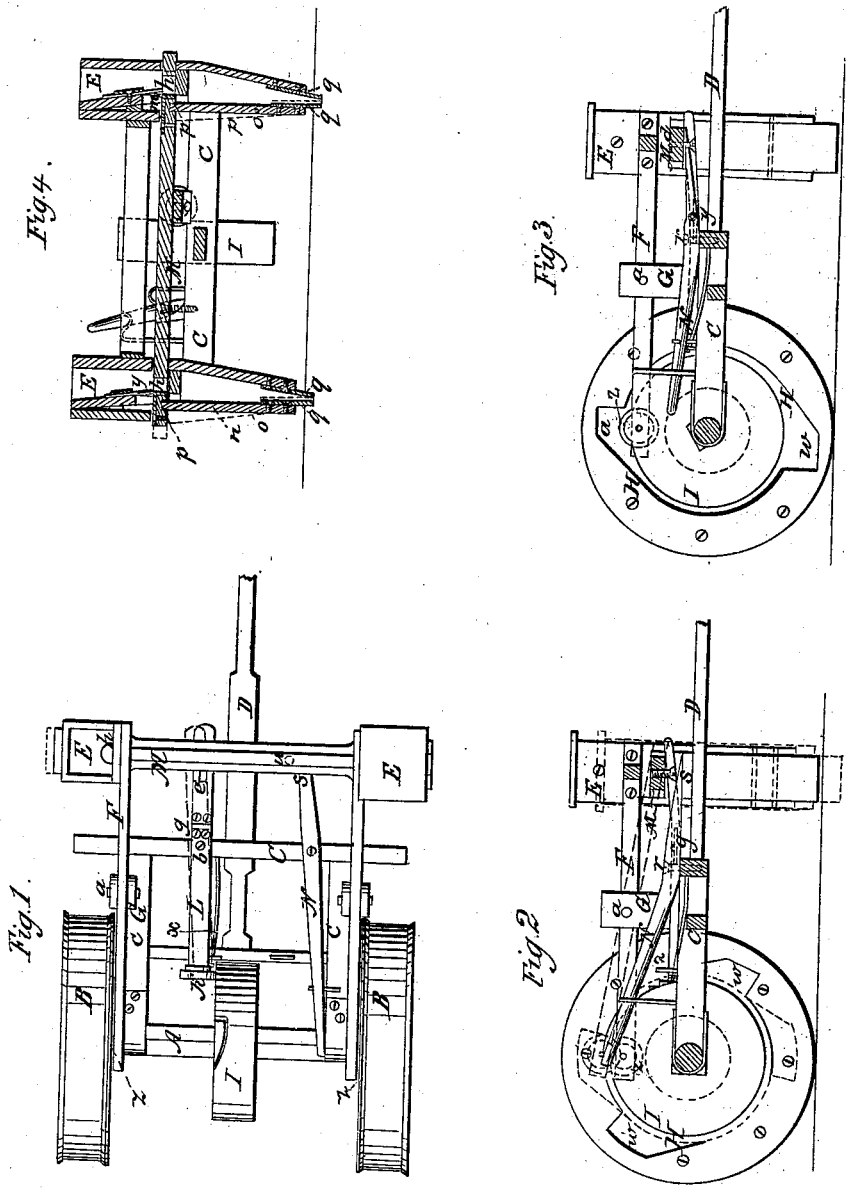
Witnesses.
J. P. S. Otterson
E. D. Dodge
Inventor.
H. M. Wyeth
By his Atty
Thos. H. Dodge

UNITED STATES PATENT OFFICE.

H. M. WYETH, OF BLOOMFIELD, IOWA.

IMPROVEMENT IN CORN-PLANTERS.

Specification forming part of Letters Patent No. 39,982, dated September 15, 1863.

*To all whom it may concern:*

Be it known that I, H. M. WYETH, of Bloomfield, in the county of Davis and State of Iowa, have invented certain new and useful Improvements in Corn-Planters; and I do hereby declare that the following is a full, clear, and exact description of the construction and operation of the same, reference being had to the accompanying drawings, in which—

Figure 1 represents a top view of said corn-planter. Figs. 2 and 3 represent longitudinal vertical sections through the same. Fig. 4 represents a front view of the same through center of seed-box.

My invention relates to the combination of dropping and planting boxes with certain levers, cams, and the frame of the machine, by which said planting-boxes are forced into the ground at certain intervals to deposit a number of grains therein, they being raised after each operation to clear the ground until they arrive at the next dropping-point, while at the same time the seed-slides are operated to drop the desired number of grains, the entire operation of dropping and planting the seed being automatically performed by the machine.

To enable others skilled in the art to make and use my invention, I will proceed to describe its construction and operation.

A represents the driving-shaft of the machine, to which the driving and covering wheels B are secured.

C represents the frame of the machine, which is retained in a horizontal position by the tongue D being secured to the harness of the team.

E represents the seed-boxes. They are secured to the outer ends of the levers F, which turn on their fulcra $a$ in the posts G, while the inner end of each lever is provided with a guide or friction roller, $z$, which operates within the cam-grooves H of the driving-wheels.

I represents a cam-wheel, which is secured to the driving-shaft A and operates on the friction-roller K, which is secured to the end of the lever L, and which, in conjunction with the spring-rod $x$, operates the slides M of the seed-boxes. For this purpose the rod L is pivoted at $b$ to the frame of the machine, and its outer end is attached to the slide M by means of a screw or pin, $d$, which has sufficient play in the slot $e$. The end of the rod L, which operates the slide M, is hinged to the main part at $g$, so as to make said end yielding when the seed-boxes are raised or lowered during the operation of the machine.

E represents the seed-boxes, in which the corn to be planted is contained. The seed-slide M has two seed-cells, $h$, one for each box, the size of which can be adjusted by means of the angular slide-pieces $m$, the bristles $y$ preventing the slide from becoming choked during its operation. The side $n$ of each seed-dropper is pivoted at $o$ to the box, and its upper end fits into a groove of the seed-slide M, as represented at $p$. Thus when the said slide is vibrated it also alternately opens and closes the droppers.

$q$ represents blades of steel, which enter the ground at a certain depth to deposit the seed therein.

In this machine the width from one driving-wheel to the other is equal to the space between the two seed-boxes, (the driving-wheels being also intended as coverers when the seed is deposited,) and this width is also equal to the space between two rows of corn.

N represents a lever, which is pivoted at $r$ to the frame of the machine. When the long end of this lever is depressed it may be secured in the hook 2, as represented in Fig. 3, and the short end $s$ then bears against the lower side of the seed-slide M and against a stop or pin, $u$, and not only arrests the motion of said seed-slide M, but also prevents the seed-boxes from moving vertically, and thus the machine can be thrown out of gear when it is to be moved over ground which is not to be planted.

The operation of the machine is as follows: When the machine is drawn over the field the friction-rollers $z$ in grooves H, as they pass into the notches $w$ of said grooves, permit the seed boxes or droppers E to descend by their weight, and thus the blades $q$ will enter the ground to a certain depth. The distance between the two notches $w$ on each wheel is such that the spaces at which the planters drop shall be equal to the width of the corn row. During this operation the seed-slide M is vibrated by the action of the spring $x$ and cam-wheel I, and the seed is dropped and the blades $q$ are opened and closed, and the operation is such that the said blades are closed when they are above the ground; but as soon as they have entered the ground they open and deposit the seed. They are then withdrawn while still open, and when they arrive at the highest position they again close to receive the seed from the seed-cells $h$, and the operation is repeated. The driving-wheels pass over the hills in which the corn is deposited and close and smooth the ground effectually.

Having thus fully described the nature of my invention, what I claim herein as new, and desire to secure by Letters Patent, is—

1. The combination of the seed-droppers E with the levers F and L and cams H and I, by which a vertical reciprocating motion is imparted to the seed-droppers while the seed-slide M is operated horizontally, substantially in the manner herein described.

2. In combination with the seed-hoppers, substantially as herein described, the lever N for throwing the machine out of gear, substantially in the manner herein set forth.

H. M. WYETH.

Witnesses:
J. E. SAGO,
C. W. SHAW.